Jan. 20, 1953 W. T. COLES ET AL 2,625,868
ROW CROP TYPE TRACTOR GUIDE
Filed Nov. 10, 1948 2 SHEETS—SHEET 1
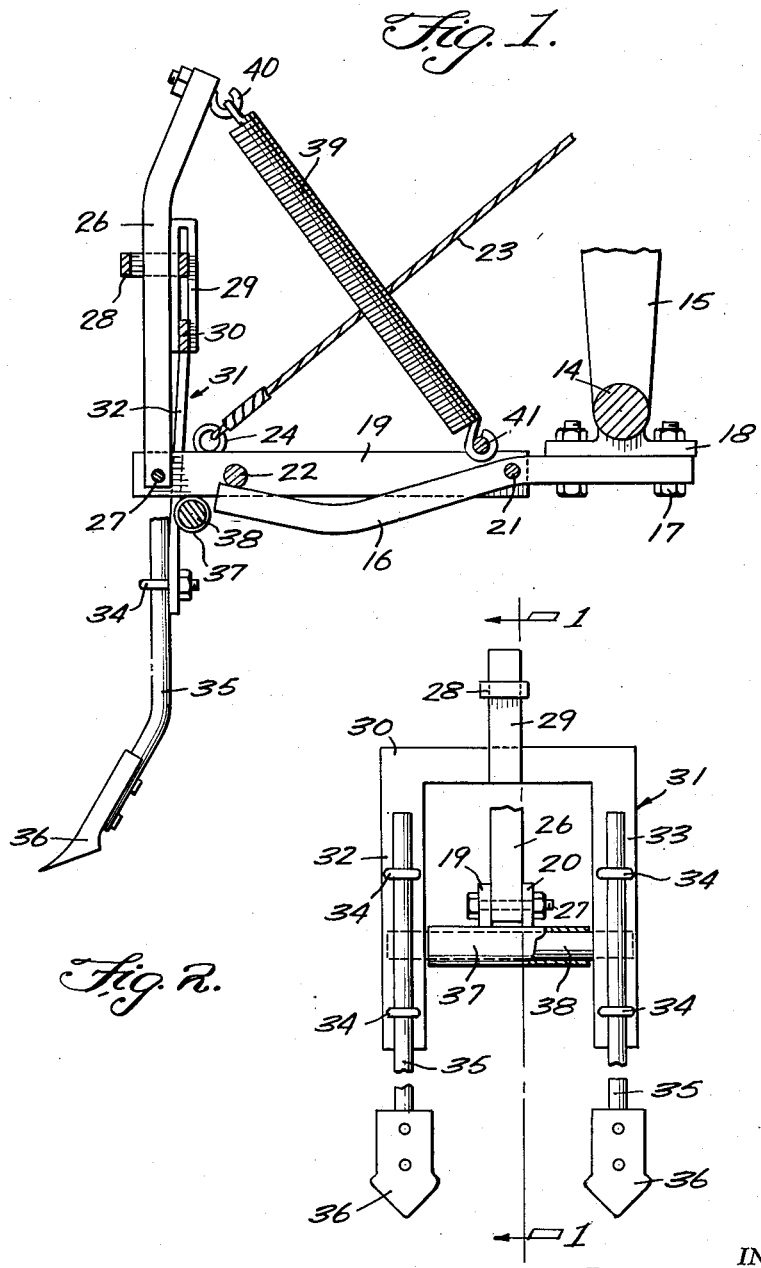
INVENTOR.
William T. Coles,
Chester E. Wells,
BY Victor J. Evans & Co.
ATTORNEYS

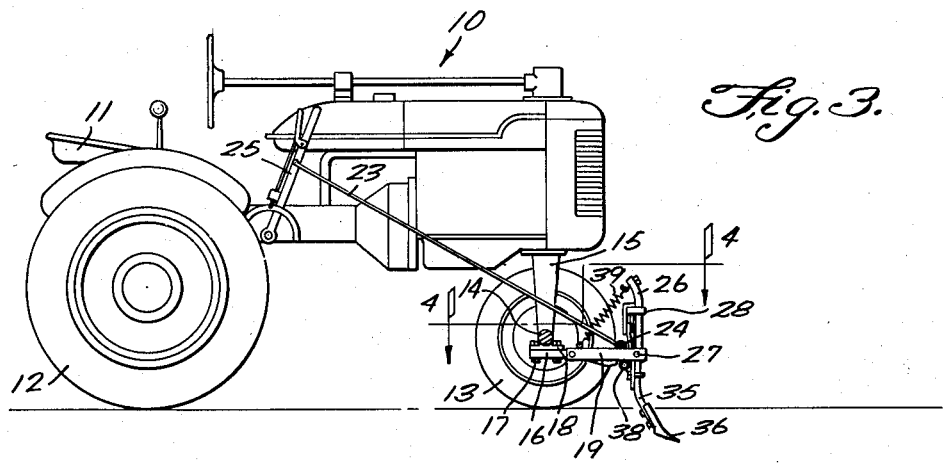
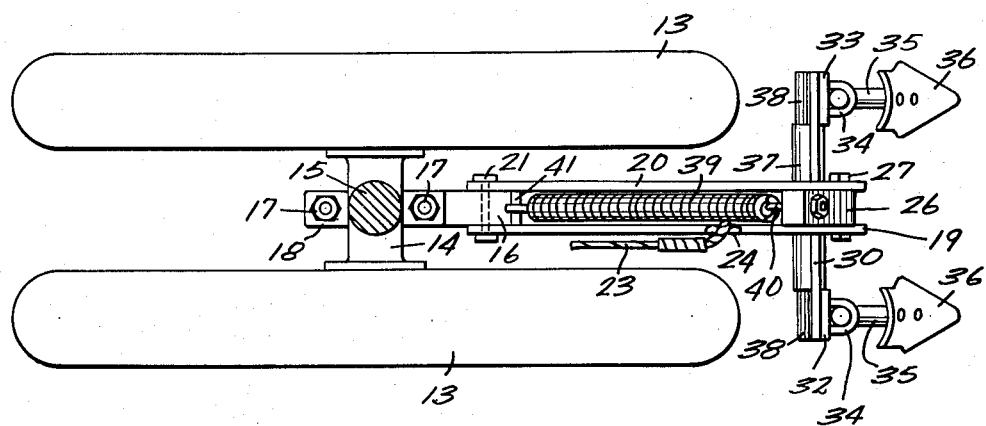

Patented Jan. 20, 1953

2,625,868

UNITED STATES PATENT OFFICE 2,625,868

ROW CROP TYPE TRACTOR GUIDE

William T. Coles and Chester E. Wells, Columbus, Nebr.

Application November 10, 1948, Serial No. 59,284

1 Claim. (Cl. 97—47)

This invention relates to a guiding attachment which can be applied readily to tractors.

The object of the invention is to provide a guide for attachments to tractors by the use of which a furrow will be opened in front of each front wheel of the tractor to thereby cause the tractor to follow a straight path without requiring the close attention of the operator.

Another object of the invention is to provide a guide attachment for mounting on a tractor which can be moved quickly into and out of active position.

A further object of the invention is to provide a guide attachment for tractors which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a sectional view taken on the line 1—1 of Figure 2;

Figure 2 is a front elevational view of the guide attachment, according to the present invention;

Figure 3 is a side elevational view of a tractor with the guide attachment thereon;

Figure 4 is an enlarged sectional view taken on the line 4—4 of Figure 3.

Referring in detail to the drawings, the numeral 10 designates a conventional tractor provided with a seat 11, rear wheels 12, and front wheels 13. A horizontally-disposed axle 14 extends between the front wheels 13, and a vertically-disposed bearing arm 15 extends between the axle 14 and the bottom of the tractor.

The guide attachment is adapted to be attached to the tractor for cutting furrows in front of each of the front wheels 13, so that the wheels will ride in the furrows and guide the tractor. The guide attachment comprises an arm 16 which has its rear end secured by bolt and nut assemblies 17 to a bracket 18 that is carried by the front axle 14. Arranged in embracing relation with regard to the arm 16 is a pair of spaced, parallel levers 19 and 20 which are pivotally connected to the arm 16 by means of a pin 21 which extends through the levers and arms. A stop member 22, Figure 1, extends between the levers 19 and 20 for abutting the upper surface of the front end of the arm 16 in order to limit downward or counter-clockwise pivotal movement of the levers 19 and 20.

For raising and lowering the tractor guide attachment, a cable 23 has one end connected to a hook 24 that is secured to the lever 19, while the other end of the cable 23 is connected to a manually-operable actuating lever 25 that is mounted on the tractor 10 in a position convenient to the operator thereof. A rod 26 has its lower end positioned between the forward ends of the levers 19 and 20 and is pivotally connected thereto by means of a bolt-and-nut assembly 27. A bracket 28 embraces the rod 26 and is also in engagement with a U-shaped clamp 29 which is secured, as by welding, to the web 30 of a U-shaped frame 31.

The frame 31 embodies a pair of spaced, parallel legs 32 and 33, and secured to each leg of the frame by U-bolts 34 is a shank 35 carrying a ground-engaging shovel 36 on its lower end. A tubular, open-ended casing 37 is secured, as by welding, to the bottom of the levers 19 and 20 adjacent the front thereof, and rotatably positioned in the casing 37 is a shaft 38. The ends of the shaft 38 project out of the casing 37 and abut the legs 32 and 33 of the frame, being rigidly secured thereto in any suitable manner.

The guide attachment includes a resilient means for permitting the shovels to safely pivot in a counter-clockwise direction in the event that the shovels contact a solid rock or similar object. This means comprises a coil spring 39 which has one end connected to a hook 40 that is secured to the rod 26 and the other end of the spring 39 is connected to a pin 41 which is connected to the levers 19 and 20. It will be seen that the lower ends of the shanks 35 are curved with respect to the main portions thereof, and the shovels 36, which are secured to the lower ends of the shanks 35, are therefore arranged at an angle with respect to the upper vertical portions of the shanks. Therefore when the tractor moves along the ground during plowing operations, the direction of the ground force will be perpendicular to the shovels 36. Therefore, this ground force will urge the shovels 36 downwardly as well as rearwardly, so that there will be no tendency for the shovels 36 to reciprocate in the ground during the use of the implement.

From the foregoing, it will be apparent that a guide attachment has been provided for attachment to a tractor which includes shovels 36 for cutting furrows in the ground as the tractor moves forwardly. The furrows will be formed directly in front of the tractor front wheels 13 so that the tractor will be guided in a straight path with a minimum effort on the part of the tractor operator.

As many embodiments may be made of this inventive concept, and as many modifications may be made in the embodiment hereinbefore shown and described, it is to be understood that all matter herein is to be interpreted merely as illustrative and not in a limiting sense.

We claim:

In a guide attachment for tractors, a plate adapted to be attached to the front axle of said tractor, an arm having one end secured to said plate, a pair of spaced parallel levers arranged in embracing relation with respect to said arm, a pin pivotally connecting one end of said levers to said arm, manually-operable means embodying a cable operatively connected to said levers adjacent the front ends thereof for causing pivotal movement of the latter, a stop member extending between said levers for abutting the upper front end of said arm to limit downward pivotal movement of said levers, a rod having its lower end positioned between the front end of said levers and pivotally connected to the latter, a U-shaped frame provided with a pair of spaced parallel legs operatively connected to said rod, a ground-engaging shovel operatively connected to each of said legs, resilient means embodying a coil spring extending between said levers and said rod for urging said shovels into engagement with the ground, a casing arranged adjacent the front of said levers and secured to the bottom thereof, and a rotatable shaft arranged in said casing and abutting the legs of said frame and rigidly secured thereto.

WILLIAM T. COLES.
CHESTER E. WELLS.

REFERENCES CITED

The following references are of record in the file of this patent:

UNITED STATES PATENTS

| Number | Name | Date |
|---|---|---|
| 2,096,656 | Stoulil | Oct. 19, 1937 |
| 2,163,682 | Heeren | June 27, 1939 |
| 2,282,367 | Koistinen | May 12, 1942 |
| 2,347,373 | Silver | Apr. 25, 1944 |
| 2,416,271 | Schaapveld | Feb. 18, 1947 |